United States Patent Office 2,802,019
Patented Aug. 6, 1957

2,802,019

SUBSTITUTED METHYL MALONONITRILES

Jerome C. Westfahl, Cuyahoga Falls, Ohio, assignor to The B. F. Goodrich Company, New York, N. Y., a corporation of New York No Drawing. Application April 30, 1954,
Serial No. 426,905

14 Claims. (Cl. 260—464)

This invention relates to novel substituted methyl malononitriles, novel derivatives of substituted methyl malononitriles and to their methods of preparation, and more particularly relates to alkyl and cycloalkyl substituted methyl malononitriles, derivatives of alkyl and cycloalkyl substituted methyl malononitriles and to their methods of preparation.

In U. S. Patents 2,476,270; 2,502,412 and 2,514,387 to Alan E. Ardis, novel methods for the preparation of monomeric 1,1-dicyano ethylene (also called vinylidene cyanide) are disclosed. Monomeric 1,1-dicyano ethylene is a clear liquid at room temperature and a crystalline solid at 0° C., melts in the range of 6.0° C. to 9.7° C., depending on the purity, with purest samples melting at 9.0° C. to 9.7° C. and boiling at 40° C. at a reduced pressure of 5 mm. of mercury.

An object of this invention is the provision of alkyl and cycloalkyl substituted methyl malononitriles. Another object of this invention is the provision of alkyl and cycloalkyl substituted methyl malononitriles, wherein two nitrile groups and a methyl group are attached to a single carbon atom, said carbon atom being attached directly to a tertiary carbon atom of an alkyl or cycloalkyl group by a carbon-to-carbon linkage. Still another object of this invention is the provision of hydrolyzed derivatives of alkyl and cycloalkyl substituted methyl malononitriles. It is still another object of this invention to prepare alkyl and cycloalkyl substituted methyl malononitriles by reacting alkyl and cycloalkyl hydrocarbons having a tertiary carbon atom within the molecular structure to which is attached a labile hydrogen atom with monomeric 1,1-dicyano ethylene in the presence of a Friedel-Crafts condensation catalyst. Still another object of this invention is to prepare derivatives of alkyl and cycloalkyl substituted methyl malononitriles by hydrolysis of the functional nitrile groups.

I have now discovered that the above enumerated objects are obtained by the reaction of monomeric 1,1-dicyano ethylene with aliphatic and alicyclic hydrocarbons having a tertiary carbon atom within the molecular structure to which is attached a labile hydrogen atom.

Among the aliphatic and alicyclic hydrocarbons which can be reacted with monomeric 1,1-dicyano ethylene in accordance with this invention are included, by way of example, the following compounds:

Aliphatic hydrocarbons having a tertiary carbon atom within the molecular structure to which is attached a labile hydrogen atom, such as isobutane; isopentane; 2-methyl pentane; 3-methyl pentane; 2,3-dimethyl butane; 2-methyl hexane; 3-methyl hexane; 2,3-dimethyl pentane; 2,4-dimethyl pentane; 3-ethyl pentane; 2,2,3-trimethyl butane; 2-methyl heptane; 3-methyl heptane; 4-methyl heptane; 4-ethyl heptane; 3-methyl octane; 2,7-dimethyl octane; 2-methyl tetradecane; 3-ethyl octadecane and the like.

Alicyclic hydrocarbons having a tertiary carbon atom within the molecular structure to which is attached a labile hydrogen atom, such as methyl cyclopropane; 1,2-dimethyl cyclopentane; methyl cyclobutane; ethyl cyclobutane; methyl cyclopentane; methyl cyclohexane; 1,3-dimethyl cyclohexane; 1,4-dimethyl cyclohexane; 1,3,5-trimethyl cyclohexane; isopropyl cyclohexane; 2-cyclohexyl butane; 1-cyclohexyl-2-methyl propane; (1,2,2)-bicycloheptane; (2,2,2)-bicyclooctane and the like.

The saturated aliphatic and alicyclic hydrocarbons set out hereinbefore have at least one tertiary carbon atom to which is attached a labile hydrogen atom within the molecular structure. Consequently, this invention includes the reaction of monomeric 1,1-dicyano ethylene with all saturated hydrocarbons containing a

unit within the molecular structure.

The reaction of monomeric 1,1-dicyano ethylene with aliphatic and alicyclic hydrocarbons having a tertiary carbon atom to which is attached a labile hydrogen atom within the molecular structure can be represented by the following general equation:

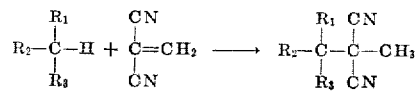

wherein $R_1$, $R_2$ and $R_3$ represent individual alkyl or cycloalkyl groups; $R_1$ and $R_2$ are linked together forming a hydrocarbon ring and $R_3$ represents an alkyl or cycloalkyl group; or $R_1$, $R_2$ and $R_3$ are linked together forming a hydrocarbon ring. Alternately the generic formula of the compounds can be written

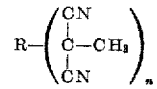

in which R is a saturated hydrocarbon group attached to the malononitrile nucleus through a tertiary carbon atom and $n$ is an integer equal to the number of tertiary carbon atoms having labile hydrogen in the original hydrocarbon. The R can be an aliphatic tertiary hydrocarbon group or a mono or polycyclic cycloaliphatic hydrocarbon.

For the reactions of this invention to proceed, it is essential to employ a condensation catalyst. The most useful of these is anhydrous aluminum chloride. The amount of catalyst is not especially critical, but it is desirable to use about 2 mols of anhydrous aluminum chloride for each mol of 1,1-dicyano ethylene in order to produce high yields of desired products in a minimum period of time.

Monomeric 1,1-dicyano ethylene in the presence of water will homopolymerize to form an amber-colored resinous material of low molecular weight. Therefore, it is highly desirable that those substances, such as aliphatic and alicyclic hydrocarbons, catalysts, and diluents which are brought into contact with monomeric 1,1-dicyano ethylene when carrying out the reactions of this invention be substantially anhydrous in order to obtain maximum yields.

The temperatures at which the reactions can be carried out can be varied over a wide range. However, because of the highly exothermic nature of the reaction, the destructive action of some condensation catalysts, such as aluminum chloride, upon aliphatic and alicyclic hydrocarbons at elevated temperatures, and the tendency of 1,1-dicyano ethylene to homopolymerize at elevated temperatures, it is preferred that the reaction temperatures be maintained between room temperatures and about 75° C., although temperatures as low as 0° C. or as high as 100° C. can be utilized. To maintain the temperatures required may in some instances require cooling of the reaction mixture during the reaction period.

Since 1,1-dicyano ethylene is substantially insoluble in aliphatic and alicyclic hydrocarbons, it is most desirable to employ organic diluents which are solvents for both monomeric 1,1-dicyano ethylene and aliphatic and alicyclic hydrocarbons. Specific solvents which can be employed in carrying out the reactions of this invention include sym.-tetrachloroethane, nitrobenzene and ortho-dichlorobenzene. Sym.-tetrachloroethane is a preferred solvent, since this compound is readily obtainable from commercial sources.

The methods utilized in carrying out the reactions of this invention can be varied widely. One method of carrying out the reactions is to prepare a mixture of 1,1-dicyano ethylene and a liquid aliphatic or alicyclic hydrocarbon and thereafter contact said mixture with aluminum chloride, or any other Friedel-Crafts condensation catalyst, suspended in an organic diluent, such as sym.-tetrachloroethane. Another method that can be employed successfully is to contact 1,1-dicyano ethylene with a gaseous aliphatic or alicyclic hydrocarbon by passing or bubbling the desired gaseous hydrocarbon through a mixture of monomeric 1,1-dicyano ethylene and a diluent having a Friedel-Crafts condensation catalyst suspended therein.

When carrying out the reactions of this invention it is believed that a complex is formed between the condensation catalyst, such as aluminum chloride, and the nitrile groups of the substituted methyl malononitriles reaction products. The resulting product-complex is desirably hydrolyzed with an acidic solution to release the condensation catalyst component of the complex. After hydrolysis of the product-complex, the substituted methyl malononitriles can be easily isolated from the reaction medium and further purified by fractional distillation at reduced pressures or by recrystallization from alcohol. The products of this invention are generally found to be liquids which in a pure state partially crystallize on standing at room temperatures.

Catalysts which are suitable in carrying out the reactions of this invention are those recognized as Friedel-Crafts catalysts, such as aluminum chloride, boron trifluoride, ferric chloride, zinc chloride and the like. Aluminum chloride is a preferred catalyst in carrying out the reactions of this invention.

The following examples are intended to illustrate the reactions of this invention and the products obtained thereby. It is not intended to limit the invention thereto, for there are numerous modifications and deviations, of course, which will be readily apparent to those skilled in the art. In the following examples all parts are by weight unless otherwise specified.

*Example I*

133.3 parts (1.0 mol) of anhydrous sublimed aluminum chloride and 250 ml. of sym.-tetrachloroethane (dried by distillation), were charged to a dry reaction flask fitted with a thermometer, dropping funnel and a stirrer. A solution consisting of 41.5 parts (0.5 mol) of 1,1-dicyano ethylene, 36.1 parts (0.5 mol) of isopentane (dried with $P_2O_5$) and 150 ml. of sym.-tetrachloroethane was placed in the dropping funnel. The 1,1-dicyano ethylene: isopentane: sym.-tetrachloroethane mixture was admitted dropwise to the reaction flask over a 47 minute interval. The reactants were continuously agitated throughout the addition. Heat was evolved during the reaction and the reaction flask was occasionally cooled to keep the reaction temperature from exceeding 40° C. After the final addition of the 1,1-dicyano ethylene: isopentane: sym.-tetrachloroethane solution to the aluminum chloride suspension in sym.-tetrachloroethane the mixture was agitated for another 30 minutes without heating. The reaction mixture was then hydrolyzed by pouring the mixture into a 2 liter beaker containing a stirred mixture of 1 liter of crushed ice and water acidified with 50 ml. of concentrated hydrochloric acid. An emulsion resulted which was filtered with suction through a layer of filter aid, the filtrate transferred to a separatory funnel and the lower organic layer removed. The aqueous layer was washed twice with chloroform and the chloroform extract was added to the organic layer. The combined solution was washed twice with water and dried with anhydrous magnesium sulphate and filtered to remove the magnesium sulphate. After filtration, the mixture was distilled at atmospheric pressures to a temperature of 100° C. to remove the chloroform. The residue, a mixture of 2,2-dicyano-3,3-dimethyl pentane, having the structural formula

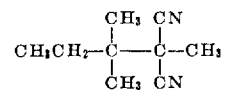

and sym.-tetrachloroethane was largely freed of sym.-tetrachloroethane by heating to 60° C. at 4.0 mm. pressure. The residue, a brown slightly viscous liquid, which upon two distillations yielded 22.32 parts of a product fraction having a boiling point of 70 to 71° C. at 2.0 mm. pressure, was cooled in an ice bath until crystallization was complete, and filtered with suction. Solid 2,2-dicyano-3,3-dimethyl pentane weighing 8.89 grams and having a melting point of 35.5 to 41° C. was thereby obtained. The solid was then recrystallized from methanol, dried in vacuo and sublimed at 35° C. and 0.02 mm. Hg to give a colorless waxy solid. The solid completely melted at 44.4° C. The composition was analyzed for carbon, hydrogen and nitrogen content and the analysis follows:

|  | Theory | Found |
| --- | --- | --- |
| Percent Carbon | 71.96 | 71.58, 71.56 |
| Percent Hydrogen | 9.39 | 9.34, 9.50 |
| Percent Nitrogen | 18.66 | 18.73, 18.64 |

*Example II*

133.3 parts (1.0 mol) of aluminum chloride suspended in 250 ml. of sym.-tetrachloroethane was charged to a flask fitted with a thermometer, dropping funnel and a stirrer. A mixture consisting of 41.5 parts (0.5 mol) of 1,1-dicyano ethylene, 50.1 parts (0.5 mol) of methyl cyclohexane and 150 ml. of sym.-tetrachloroethane was placed in the dropping funnel and the reaction carried out in accordance with the steps described in the preceding example. Purification of the crude product, 1-(1-methyl-cyclohexyl)-1-methyl malononitrile having the structural formula

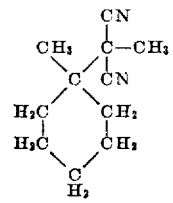

by two distillations was carried out. The product recovered in the last distillation had a boiling point of 99 to 99.5° C. at 1.0 mm. Hg. The product was analysed for carbon, hydrogen and nitrogen content and the analysis follows:

|  | Theory | Found |
| --- | --- | --- |
| Percent Carbon | 74.95 | 74.76, 74.77 |
| Percent Hydrogen | 9.15 | 9.08, 8.93 |
| Percent Nitrogen | 15.90 | 15.54, 15.65 |

*Example III*

41.5 parts (0.5 mol) of 1,1-dicyano ethylene and 57.1 parts (0.5 mol) of 2,2,4-trimethyl pentane (isooctane) were reacted in the presence of 133.3 parts (1.0 mol) of aluminum chloride and sym.-tetrachloroethane in accordance with the methods described in Example I. Isooctyl methyl malononitrile having the structural formula

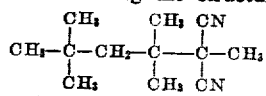

was isolated from the crude reaction product in good yield and identified by infra-red absorption spectra.

Examples IV to VIII

Reaction of monomeric 1,1-dicyano ethylene, in accordance with the method employed in Example I, with the aliphatic or alicyclic hydrocarbons, set out in the table below, results in the recovery of the substituted methyl malononitriles, set out hereinafter.

| Example | Aliphatic or Alicyclic Hydrocarbon | Resulting Substituted Methyl Malononitrile |
|---------|-----------------------------------|--------------------------------------------|
| IV | CH₃–CH(CH₃)–H with CH₃ | CH₃–C(CH₃)(CN)–C(CH₃)(CN)–CH₃ |
| V | H–C(CH₃)(CH₃)–(CH₂)₄–C(CH₃)(CH₃)–H | CH₃–C(CN)(CH₃)–C(CH₃)(CH₃)–(CH₂)₄–C(CH₃)(CH₃)–C(CH₃)(CN)–CH₃ |
| VI | H₂C–CH(CH₃)–H / H₂C–CH₂ (cyclobutyl) | H₂C–C(CH₃)(CN)–C(CH₃)(CN)–CH₃ / H₂C–CH₂ |
| VII | cyclohexane H–C< >C–H | CN,CH₃-substituted cyclohexane-bis(methylmalononitrile) |
| VIII | bicyclic hydrocarbon H–C(CH₂)... | corresponding bis-substituted methyl malononitrile |

The novel alkyl and cycloalkyl substituted methyl malononitriles of this invention are useful starting materials for the preparation of the following novel compositions: (1) alkyl and cycloalkyl substituted methyl cyanoacetamides, (2) alkyl and cycloalkyl substituted methyl malonamides, (3) alkyl and cycloalkyl substituted methyl cyanoacetic acids, (4) alkyl and cycloalkyl substituted methyl malonic acids, (5) alkyl and cycloalkyl substituted methyl propionitriles, and (6) alkyl and cycloalkyl substituted methyl propionamides.

The aforementioned compounds are all characterized by containing the structural unit

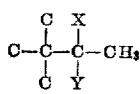

wherein the functional groups X and Y represent nitrile and amide, amide and amide, carboxylic and amide, carboxylic and carboxylic, nitrile and carboxylic, nitrile and methyl, amide and methyl groups, respectively.

The aforementioned derivatives of alkyl and cycloalkyl substituted methyl malononitriles can be prepared by basic hydrolysis of alicyclic or aliphatic methyl malononitriles resulting in hydrolysis of one or both of the nitrile groups to amide or carboxylic acid groups. Decarboxylation of the carboxylic acid groups can be effected by heating at elevated temperatures. The alkyl or cycloalkyl substituted methyl malononitriles can also be converted to corresponding amides by hydration with a strong mineral acid.

The following examples are intended to illustrate the novel derivatives of alkyl and cycloalkyl substituted methyl malononitriles and their methods of preparation. All parts are by weight unless specified otherwise.

Example IX

A solution of 4.9 parts of 1-(1-methyl cyclohexyl)-1-methyl malononitrile obtained from the reaction described in Example II in 20.0 ml. of 95.0 percent sulfuric acid was heated to 90.0° C. for five minutes, cooled and poured into 200.0 ml. of cold water. Crude 1-(1-methyl cyclohexyl)-1-methyl cyanoacetamide was isolated from the solution by filtration and washed with a 5.0 percent NaOH solution, water and dried. The dried product recrystallized from a benzene-hexane solution had a melting point of 154.3 to 155.0° C. The product, 1-(1-methyl cyclohexyl)-1-methyl cyanoacetamide was analysed for carbon, hydrogen and nitrogen content and the analysis follows:

|  | Theory | Found |
|---|---|---|
| Percent Carbon | 68.01 | 68.09 |
| Percent Hydrogen | 9.34 | 9.37 |
| Percent Nitrogen | 14.42 | 14.34 |

Example X

A solution consisting of 10.0 parts of 1-(1-methyl cyclohexyl)-1-methyl malononitrile obtained from the reaction of Example II, 30.0 parts of KOH, 30.0 ml. of water and 125.0 ml. of ethanol were refluxed for 263 hours. Ammonia was slowly evolved during the refluxing. 50.0 ml. of water was added to the mixture and the ethanol removed by distillation to the boiling point of water. The distillant was cooled, acidified to Congo red, and shaken with ether. The solid 1-(1-methyl cyclohexyl)-1-methyl malonamide which was insoluble in both ether and water was filtered from the ether and water solutions and dried. Recrystallization from ethanol gave colorless crystals having a melting point of 239° C. The analysis of 1-(1-methyl cyclohexyl)-1-methyl malonamide for carbon, hydrogen and nitrogen was as follows:

|  | Theory | Found |
|---|---|---|
| Percent Carbon | 62.23 | 62.42, 62.53 |
| Percent Hydrogen | 9.50 | 9.58, 9.58 |
| Percent Nitrogen | 13.20 | 13.10 |

Example XI

The water and ether layers obtained in Example X were separated and the aqueous layer was extracted with ether.

The ether extract and the ether layer were combined and extracted with an aqueous sodium bicarbonate solution. The resulting aqueous solution was separated from the ether, acidified with a mineral acid to Congo red, and a liquid water-insoluble product formed which solidified on standing at room temperature to yield 6.9 grams of 1-(1-methyl cyclohexyl)-1-methyl cyanoacetic acid. Recrystallization of the crude product from a hexane-benzene solution gave colorless crystals, which when melted, cooled, and powdered yielded a solid having a melting point of 103.5 to 104.5° C. Analysis of the product for carbon, hydrogen and nitrogen content and neutral equivalent was as follows:

|  | Theory | Found |
| --- | --- | --- |
| Percent Carbon | 67.66 | 67.36, 67.20 |
| Percent Hydrogen | 8.78 | 8.68, 8.78 |
| Percent Nitrogen | 7.17 | 7.15 |
| Neutral Equivalent | 195 | 197.5 |

*Example XII*

1-(1-methyl cyclohexyl) propionitrile was prepared by heating 0.50 parts of 1-(1-methyl cyclohexyl)-1-methyl cyanoacetic acid, obtained from Example XI, at 210–220° C. for 45 minutes. A yield of 0.31 part of 1-(1-methyl cyclohexyl)-propionitrile was obtained having a boiling point of 220–227° C. and refractive index $N_D^{25}$ 1.4631.

*Example XIII*

A solution of 0.26 part of 1-(1-methyl cyclohexyl)-propionitrile in 2.0 ml. of 95.0 percent sulfuric acid was heated for 15 minutes in a boiling water bath. The cooled solution was poured in 20 ml. of cold water with stirring and a light tan solid formed. The solid 1-(1-methyl cyclohexyl)-propionamide was isolated and recrystallized twice from a benzene-hexane solution to give colorless needles having a melting point of 108 to 108.5° C. Analysis of the product for carbon, hydrogen and nitrogen content was as follows:

|  | Theory | Found |
| --- | --- | --- |
| Percent Carbon | 70.95 | 70.70 |
| Percent Hydrogen | 11.31 | 11.33 |
| Percent Nitrogen | 8.28 | 8.14 |

The foregoing examples are illustrative of the means of preparing novel derivatives of cycloalkyl substituted methyl malonoitriles. Derivatives of alkyl substituted methyl malononitriles corresponding to those of the foregoing examples can be prepared in accordance with the methods of the above examples.

The novel alkyl and cycloalkyl substituted methyl malononitriles of this invention are not only useful in the prepartion of novel cyanoacetamide, malonamide, cyanoacetic acid, malonic acid, propionitrile and propionamide derivatives which can be used to synthesize other chemical compositions, but are also useful in the field of economic poisons. For example, those derivatives having functional amide groups within the molecular structure are useful as plant nutrients and those derivatives having functional nitrile groups within the molecular structure, as well as the alkyl and cycloalkyl substituted methyl malononitriles, can be utilized as fungicides.

Although specific embodiments of this invention have been set out in this specification it is not intended that this invention shall be limited thereto, but shall be construed only in accordance with the appended claims.

I claim:

1. Di-substituted malononitriles having the structure

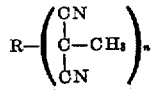

in which R is a saturated hydrocarbon group of from 4 to about 20 carbon atoms attached to the malononitrile nucleus through a tertiary carbon atom and n is an integer from 1 to 2, inclusive.

2. Di-substituted malononitriles having directly attached to the same carbon atom of malononitrile a methyl group and a saturated hydrocarbon group of from 4 to 20 carbon atoms and having a tertiary carbon atom within its molecular structure, said saturated hydrocarbon group being attached to the carbon atom of malononitrile through a teritiary carbon atom.

3. Di-substituted malononitriles having directly attached to the same carbon atom of malononitrile a methyl group and a saturated alkyl hydrocarbon group of from 4 to 20 carbon atoms and having a tertiary carbon atom within its molecular structure, said saturated alkyl hydrocarbon being attached to the carbon atom of malononitrile through a tertiary carbon atom.

4. Di-substituted malononitriles having directly attached to the same carbon atom of malononitrile a methyl group and a saturated cycloalkyl hydrocarbon group of from 4 to 20 carbon atoms and having a tertiary carbon atom within its molecular structure, said saturated cycloalkyl hydrocarbon group being attached to the carbon atom of malononitrile through a tertiary carbon atom.

5. The method which comprises reacting monomeric 1,1-dicyano ethylene with a saturated hydrocarbon having at least one tertiary carbon atom to which is attached a labile hydrogen atom in the presence of a Friedel-Crafts catalyst to form a compound having the structure

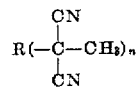

in which R is a saturated hydrocarbon group attached to the malononitrile group through a tertiary carbon atom and n is an integer equal to the number of tertiary carbon atoms having labile hydrogen in the hydrocarbon reactant.

6. The method of claim 5 in which the reaction is carried out in the presence of an inert diluent.

7. The method of claim 5 in which R is a staurated aliphatic hydrocarbon group.

8. The method of claim 5 in which R is a saturated alicyclic hydrocarbon group.

9. The method which comprises reacting monomeric 1,1-dicyano ethylene with 2-methyl butane in the presence of a diluent and a Friedel-Crafts condensation catalyst

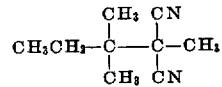

10. The compound, 1-(1-methylcyclohexyl)-1-methyl malononitrile of the following structural formula:

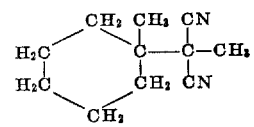

11. The compound, 2,2-dicyano-3,3-dimethyl pentane having the structural formula:

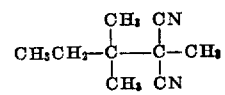

12.

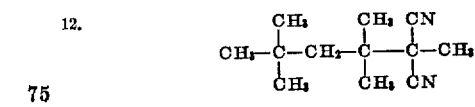

13. 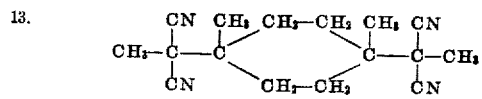
14. 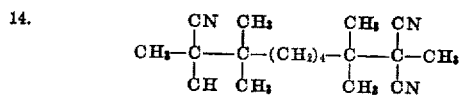
References Cited in the file of this patent
UNITED STATES PATENTS
| | | |
|---|---|---|
| 2,006,314 | Halbig et al. | June 25, 1935 |
| 2,260,800 | Bush | Oct. 28, 1941 |
| 2,447,196 | Martin et al. | Aug. 17, 1948 |
| 2,518,397 | Stover | Aug. 8, 1950 |
OTHER REFERENCES
Birch et al., Chem. Abst., vol. 38, col. 337 (1944).

UNITED STATES PATENT OFFICE
Certificate of Correction

Patent No. 2,802,019  August 6, 1957

Jerome C. Westfahl

It is hereby certified that error appears in the printed specification of the above numbered patent requiring correction and that the said Letters Patent should read as corrected below.

Column 6, line 58, for "distillant" read —distilland—; column 9, lines 6 to 10, claim 14, the formula should appear as shown below instead of as in the patent—

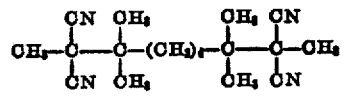

Signed and sealed this 29th day of October 1957.

[SEAL]

Attest:
KARL H. AXLINE,
*Attesting Officer.*

ROBERT C. WATSON,
*Commissioner of Patents.*